(12) United States Patent
Van Gaasbeck et al.

(10) Patent No.: US 10,007,462 B1
(45) Date of Patent: Jun. 26, 2018

(54) METHOD AND SYSTEM FOR ADAPTIVE DATA MIGRATION IN SOLID STATE MEMORY

(71) Applicant: EMC Corporation, Hopkinton, MA (US)

(72) Inventors: Richard H. Van Gaasbeck, Mountain View, CA (US); Michael W. Shapiro, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 44 days.

(21) Appl. No.: 15/087,730

(22) Filed: Mar. 31, 2016

(51) Int. Cl.
  *G06F 12/02* (2006.01)
  *G06F 3/06* (2006.01)

(52) U.S. Cl.
  CPC .......... *G06F 3/0647* (2013.01); *G06F 3/0604* (2013.01); *G06F 3/0631* (2013.01); *G06F 3/0679* (2013.01)

(58) Field of Classification Search
  None
  See application file for complete search history.

(56) References Cited

U.S. PATENT DOCUMENTS

| | | | |
|---|---|---|---|
| 8,041,884 B2 | 10/2011 | Chang | |
| 8,700,840 B2 | 4/2014 | Paley et al. | |
| 8,891,303 B1 | 11/2014 | Higgins et al. | |
| 2008/0072223 A1* | 3/2008 | Cowperthwaite | G06F 9/4403 718/1 |
| 2009/0168505 A1 | 7/2009 | Hanzawa et al. | |
| 2010/0064094 A1* | 3/2010 | Yeh | G06F 12/0246 711/103 |
| 2010/0172180 A1 | 7/2010 | Paley et al. | |
| 2011/0299317 A1 | 12/2011 | Shaeffer et al. | |
| 2013/0282967 A1* | 10/2013 | Ramanujan | G11C 16/06 711/103 |
| 2014/0219034 A1 | 8/2014 | Gomez et al. | |
| 2014/0226413 A1 | 8/2014 | Gomez et al. | |
| 2014/0369124 A1 | 12/2014 | Moon et al. | |
| 2015/0221358 A1 | 8/2015 | Brandi | |
| 2016/0027481 A1 | 1/2016 | Hong | |
| 2016/0148700 A1 | 5/2016 | Oh | |

* cited by examiner

*Primary Examiner* — Duc Doan
(74) *Attorney, Agent, or Firm* — Chamberlain Hrdlicka

(57) ABSTRACT

A method for data migration in solid state memory. The method includes making a first determination that a write limit of a first memory region of the solid state memory has been reached, and based on the first determination: allocating a second memory region in the solid state memory. The method further includes, based on making the first determination: migrating a first data fragment from a first memory location in the first memory region to a corresponding second memory location in the second memory region, updating a migration progress index to include the second memory location, directing future read and write requests that target memory locations included in the migration progress index to the second memory region, and directing future read and write requests that target memory locations not included in the migration progress index to the first memory region.

17 Claims, 9 Drawing Sheets

METHOD AND SYSTEM FOR ADAPTIVE DATA MIGRATION IN SOLID STATE MEMORY

BACKGROUND

Solid state memory storage devices may be used to store data. Such solid state storage devices may be based on solid state memory such as, for example, Phase Change Memory (PCM), Spin Torque Magnetic Random Access Memory, that degrades as data are written to the memory. Only a limited number of writes to solid state memory may thus be permissible before the solid state memory loses its ability to reliably retain data. As such, even with perfect wear leveling, it may become necessary for a solid state memory storage device to migrate data from one region of storage to another fresh region of storage, while a user workload is in progress.

DETAILED DESCRIPTION

Figure 1A:
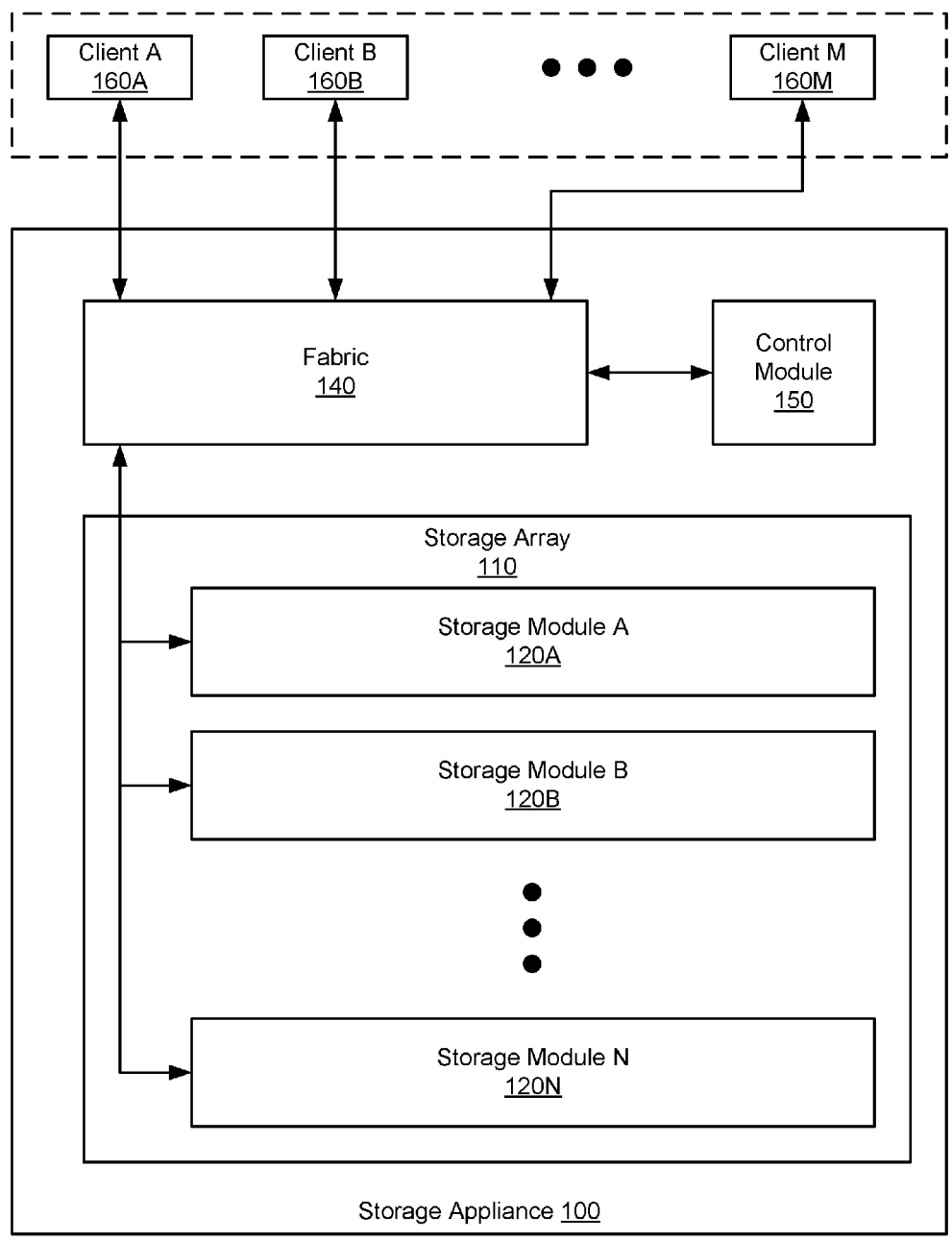
FIGS. 1A and 1B show systems, in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6C, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to data migration in solid state storage systems. More specifically, embodiments of the technology are directed to tracking the wear of one or more memory regions of a solid state storage module, and to performing a data migration, from worn memory regions to different memory regions on the same or on a different solid state storage module. A data migration being performed prior to reaching a critical degradation of the memory region, at which point reliable storage of data in the memory region may no longer be guaranteed, may thus ensure that the stored data are not compromised by a degradation of the storage medium.

Figure 1B:
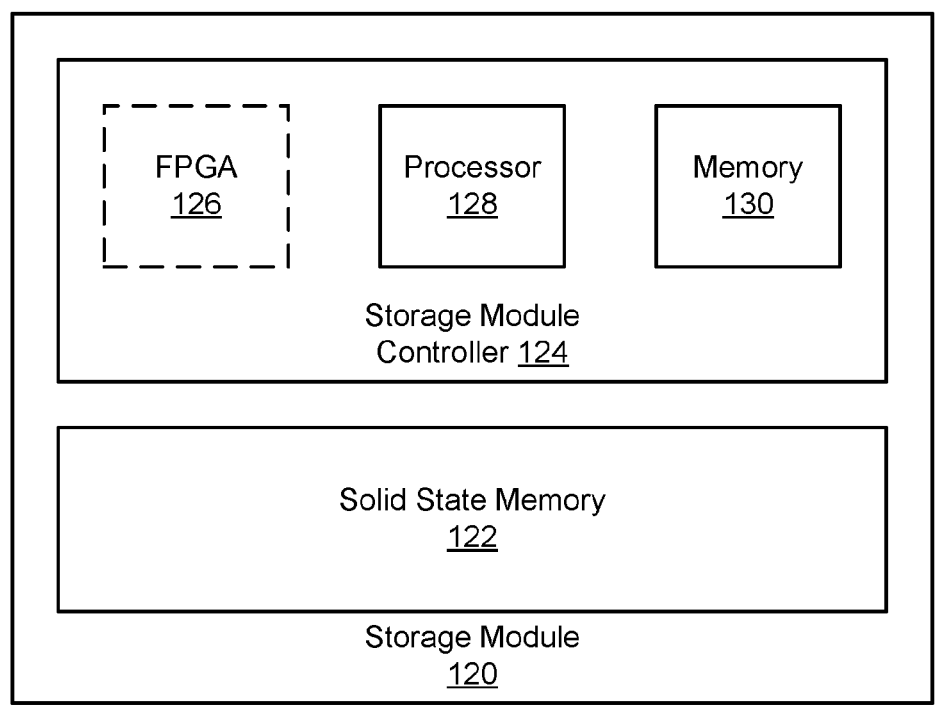

FIGS. 1A and 1B show systems in accordance with one or more embodiments of the technology. Referring to FIG. 1A, the system includes one or more clients (client A (160A)-client M (160M)) that are operatively connected to a storage appliance (100).

In one embodiment of the technology, the clients (160A-160M) may be any type of physical system that includes functionality to issue a read request to the storage appliance (100) and/or to issue a write request to the storage appliance (100). Though not shown in FIG. 1A, each of the clients (160A-160M) may include a client processor (not shown), client memory (not shown), and any other software and/or hardware necessary to implement one or more embodiments of the technology.

In one embodiment of the technology, the clients (160A-160M) are configured to execute an operating system (OS) that includes a file system, a block device driver, an application programming interface (API) to enable the client to access the storage appliance, and/or a user programming library. The file system, the block device driver and/or the user programming library provide mechanisms for the storage and retrieval of files from the storage appliance (100). More specifically, the file system, the block device driver and/or the user programming library include functionality to perform the necessary actions to issue read requests and write requests to the storage appliance. They may also provide programming interfaces to enable the creation and deletion of files, reading and writing of files, performing seeks within a file, creating and deleting directories, managing directory contents, etc. In addition, they may also provide management interfaces to create and delete file systems. In one embodiment of the technology, to access a file, the operating system (via the file system, the block device driver and/or the user programming library) typically provides file manipulation interfaces to open, close, read, and write the data within each file and/or to manipulate the corresponding metadata.

In one embodiment of the technology, the clients (160A-160M) interface with the fabric (140) of the storage appliance (100) to communicate with the storage appliance (100), as further described below.

In one embodiment of the technology, the storage appliance (100) is a system that includes persistent storage such as solid state memory, and is configured to service read requests and/or write requests from one or more clients (160A-160M).

The storage appliance (100), in accordance with one or more embodiments of the technology, includes one or more storage modules (120A-120N) organized in a storage array (110), a control module (150), and a fabric (140) that interfaces the storage module(s) (120A-120N) with the clients (160A-160M) and the control module (150). Each of these components is described below.

The storage array (110), in accordance with an embodiment of the technology, accommodates one or more storage modules (120A-120N). The storage array may enable a modular configuration of the storage appliance, where storage modules may be added to or removed from the storage appliance (100), as needed or desired. A storage module (120), in accordance with an embodiment of the technology, is described below, with reference to FIG. 1B.

Continuing with the discussion of the storage appliance (100), the storage appliance includes the fabric (140). The fabric (140) may provide connectivity between the clients (160A-160M), the storage module(s) (120A-120N) and the control module (150) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

Further, in one or more embodiments of the technology, the storage appliance (100) includes the control module (150). In general, the control module (150) is a hardware module that may be configured to perform administrative tasks such as allocating and de-allocating memory regions in the solid state memory modules (120A-120N) and making allocated memory regions accessible to the clients (160A-160M). Further, the control module may perform one or more steps to balance the wear within a memory region and/or to migrate the content of a worn memory region to a different memory region. In one embodiment of the technology, these functions (e.g., one or more of the steps described in FIGS. 3-5) are performed by the control module (150).

The control module (150) interfaces with the fabric (140) in order to communicate with the storage module(s) (120A-120N) and/or the clients (160A-160M). The control module may support one or more of the following communication standards: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE), or any other communication standard necessary to interface with the fabric (140).

FIG. 1B shows a storage module, in accordance with one or more embodiments of the technology. The storage module (120) includes solid-state memory (122) to persistently store data. In one embodiment of the technology, the solid-state memory (122) of the storage module (120) may include, but is not limited to, Spin Torque Magnetic Random Access Memory (ST-RAM) and Phase Change Memory (PCM). Generally, the solid state memory (122) may correspond to any type of memory that has a finite number of program-erase cycles or write cycles. In one or more embodiments of the technology, the limited number of program-erase or write cycles necessitates the use of methods to avoid excessive writes to the same region of the solid state memory in order to prevent data loss, as described in detail below.

Continuing with the discussion of the storage module (120), shown in FIG. 1B, the storage module (120), in accordance with one or more embodiments of the technology, further includes a storage module controller (124). In one embodiment of the technology, the storage module controller (124) is configured to receive and service requests to read from and/or write data to the solid state memory (122). These requests may originate from the clients (160A-160M) or from the control module (150), and may be conveyed to the storage module controller (124) via the fabric (140). The storage module controller (124) may perform one or more of the steps described in FIG. 3 in order to service a write request. Further, the storage module controller (124) may perform or may support administrative tasks including the methods described in FIGS. 4 and 5.

Figure 3:
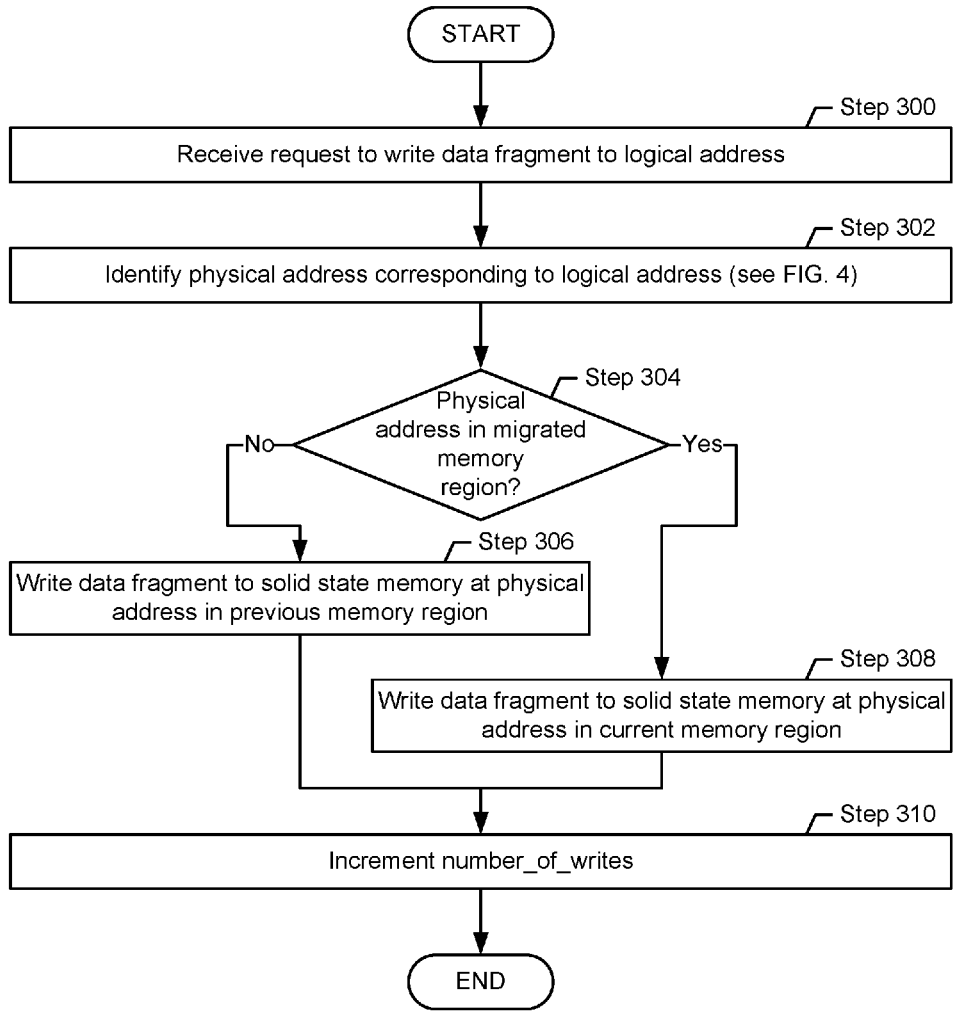
FIGS. 3-5 show flowcharts, in accordance with one or more embodiments of the technology.
Figure 4:
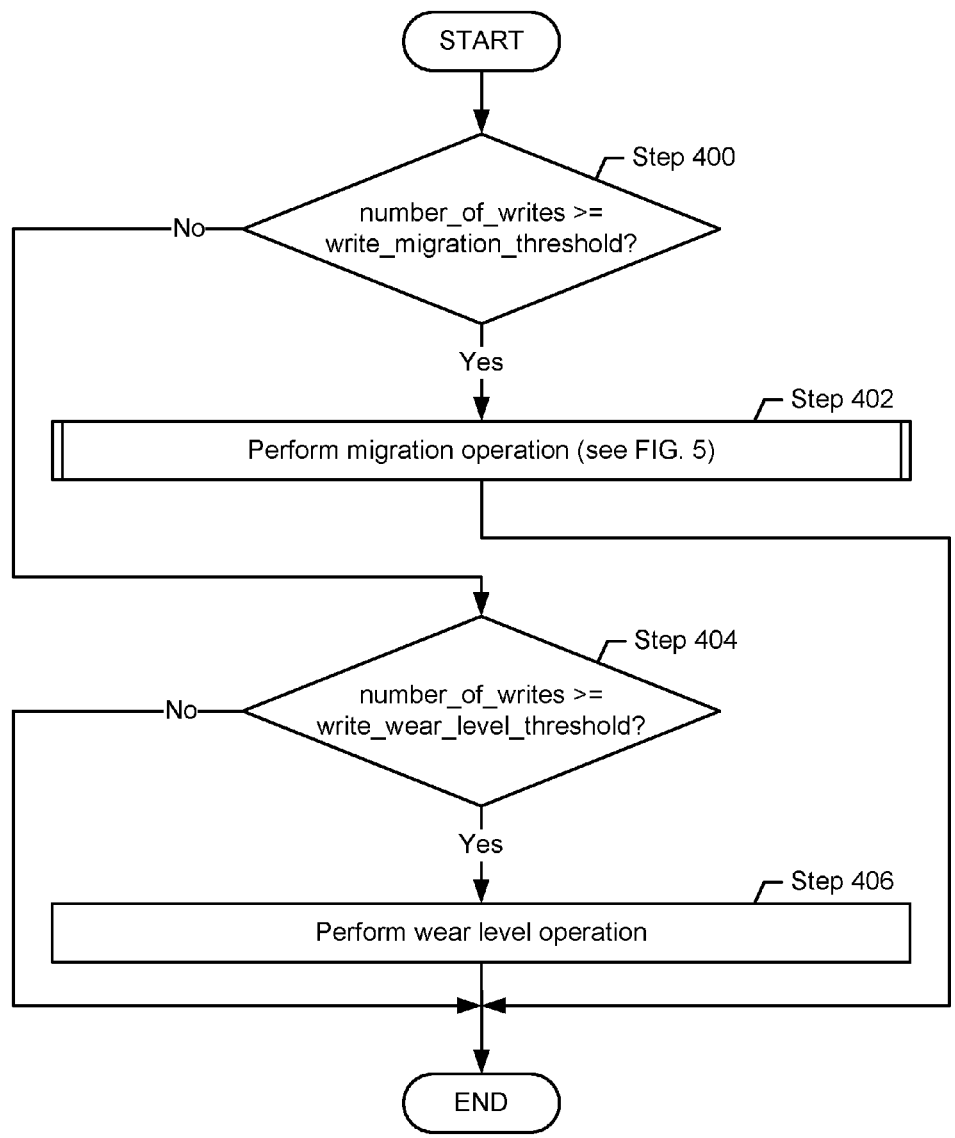
Figure 5:
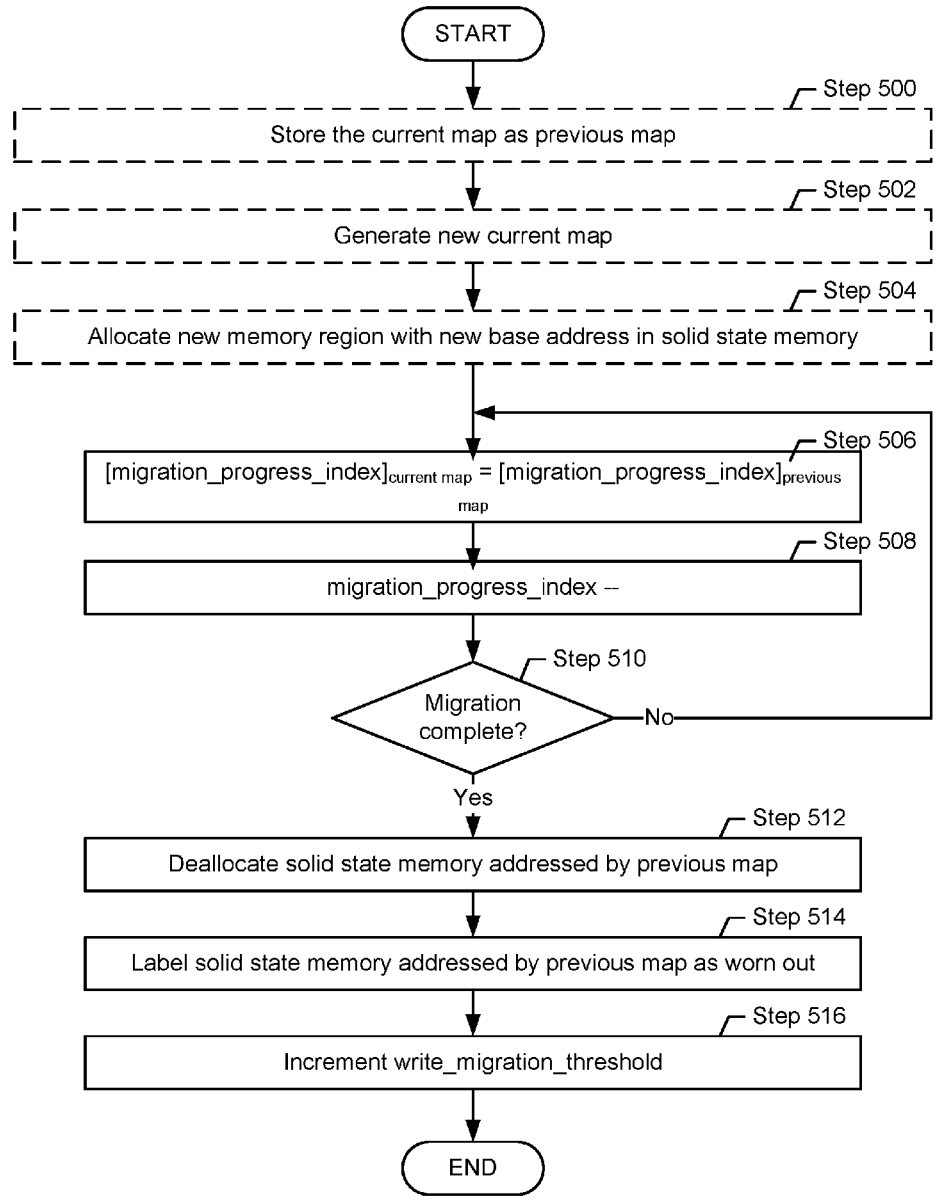

In one embodiment of the technology, the storage module controller (124) includes a processor (128) (e.g., one or more cores, or micro-cores of a processor that are configured to execute instructions) and memory (130) (e.g., volatile memory that may be, but is not limited to, dynamic random-access memory (DRAM), synchronous DRAM, SDR SDRAM, and DDR SDRAM) to perform at least one of the steps described in FIGS. 3-5. Alternatively or additionally, the storage module controller (124) may include a field-programmable gate array (FPGA) and/or an application-specific integrated circuit (ASIC) (126). In a storage module controller that includes an FPGA and/or ASIC and a processor, the FPGA and/or ASIC may primarily service read and write requests, whereas the processor may handle or support administrative tasks, including those related to wear balancing and/or data migration, as further described below.

One skilled in the art will recognize that the architecture of the system is not limited to the components shown in FIGS. 1A and 1B. For example, the components of the storage appliance (100) may include any number of storage modules (120A-120N). Further, the storage module controller (124) of the storage module (120) and the control module (150) of the storage appliance (100) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology.

Figure 2A:
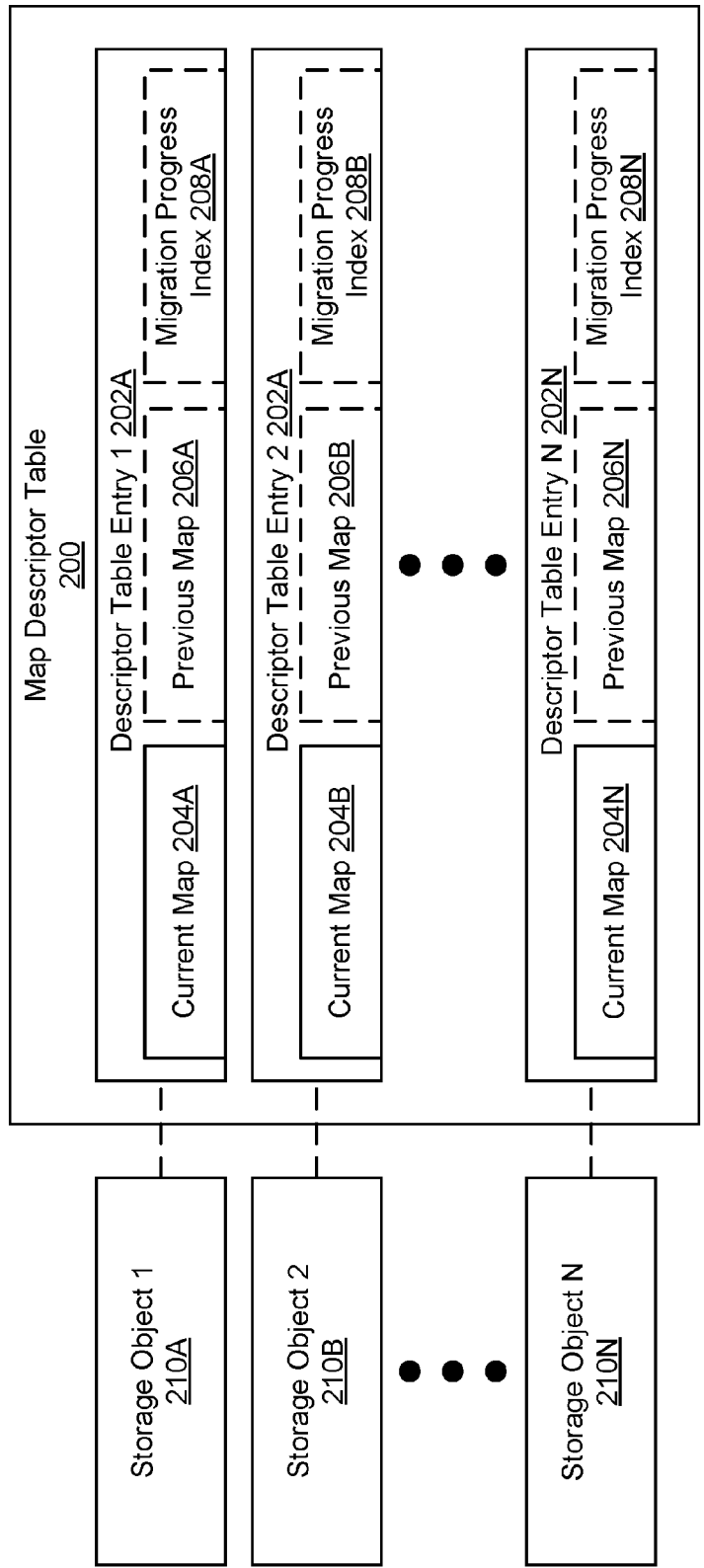
FIGS. 2A-2C show representations of data stored in solid state memory, in accordance with one or more embodiments of the technology.

FIGS. 2A-and 2B show logical representations of data stored in solid state memory, in accordance with one or more embodiments of the technology. Logical representations may be used by clients to address the solid state memory, even though the physical representations that describe how data are stored in solid state memory may be different from the logical representations. Accordingly a translation from logical to physical representation may be performed to enable read and write operations to/from the solid state memory.

In FIG. 2A, a set of storage objects (210A-210N) is shown. Each of these storage objects is associated with a descriptor table entry (202A-202N). The descriptor table entries are organized in a map descriptor table (200).

A storage object (210), in accordance with an embodiment of the technology, is data written or to be written to the solid state memory (122) of a storage module, for example by a client (160). The data may be data of various types and may be organized in one or more files, directories, archives, logical drive partitions, etc. Those skilled in the art will recognize that the data may be of any type and size, without departing from the technology. A client (160) that intends to write a storage object (210) to the solid state memory (122) may rely on elements of the descriptor table entry (202) corresponding to the storage object, in order to identify a memory location to which to write, as described below in FIG. 3. Multiple descriptor table entries may be relied upon for describing a single storage object, for example, if the storage object is large, spanning multiple memory regions.

Each descriptor table entry (202), in accordance with one or more embodiments of the technology, includes a current map (204), and may further include a previous map (206) and a "migration_progress_index" (208). The current map (204), the previous map (206), and the "migration_progress_index" (208) may include information for locating a memory location for a storage object (210) when the storage object is written to or read from the solid state memory (122) of a storage module (120). Alternatively, the current map (204) and the previous map (204) of a descriptor table entry (202) may be located elsewhere, and the descriptor table entry may include pointers to the current map (204) and the previous map (206), located elsewhere. By using pointers, multiple descriptor table entries (202) may address the same maps.

A current map may include information enabling the identification of a memory location for a storage object in a memory region that is currently being used for storing the storage object, such as the physical address base or address ranges used for this portion of the object. In contrast, a previous map may include information enabling the identification of a memory location for a storage object in a memory region that was previously used for storing the storage object, but that is being phased out by migrating the data it contains to the region that is currently being used. The previously used memory region may, for example, be no longer suitable for reliable data storage because a large number of write operations to the memory region has worn out the memory region. The migration operation for transferring the data from the previously used memory region, defined by the previous map, to the currently used memory region, defined by the current map, is described below with reference to FIGS. 4 and 5. A description of a current/previous map is provided in FIG. 2B.

Each descriptor table entry (202), in accordance with an embodiment of the technology, further includes a migration progress index (208). "migration_progress_index" (208) may serve as an indicator to distinguish memory locations whose data has already been migrated from memory locations for which the migration has not yet been performed or for which migration has not been completed.

In one or more embodiments of the technology, data from memory locations is migrated from a previous memory region to a current memory region in a systematic manner (e.g., in ascending or descending order of memory locations). "migration_progress_index" may thus merely specify a most recently migrated memory location, thereby implicitly also specifying all memory locations that were migrated during previous migration operations. "migration_progress_index" may be, for example, a pointer identifying the memory location for which the most recent migration operation was performed. Accordingly, data fragments at this memory location and at memory locations for which a migration operation was previously performed may be assumed to be accessible in the current memory region, whereas data fragments at other memory locations (e.g., memory locations for which no migration has been performed yet), may be assumed to be accessible in the previous memory region.

Current and previous maps may be used to support read and write operations to and from the solid state memory (122) of a storage module (120), as described below with reference to FIG. 3. Current and previous maps may further be used to support administrative operations, for example, in order to maintain stored information in the presence of degrading solid state memory, as described in detail in FIGS. 4 and 5.

Current and previous maps (204A-204N, 206A-206N) and migration progress indices (208A-208N) may be stored in the memory (130) of the storage module controller (124) and may be relied upon by the FPGA (126) and/or the processor (128) to direct read and/or write operations to the appropriate region in the solid state memory (122) of the storage module (120).

In one embodiment of the technology, the FPGA (126) may coordinate read and/or write requests from and to the solid state memory (122). The FPGA may thus access the current and previous maps and "migration_progress_index" to service these read and/or write requests. Further, the processor (128) of the storage module controller (124) and/or a processor in the control module (150) of the storage appliance (100)) may update and maintain the current maps (204A-204N), the previous maps (206A-206N) and "migration_progress_index" (208A-208N), using the methods described below.

Figure 2B:
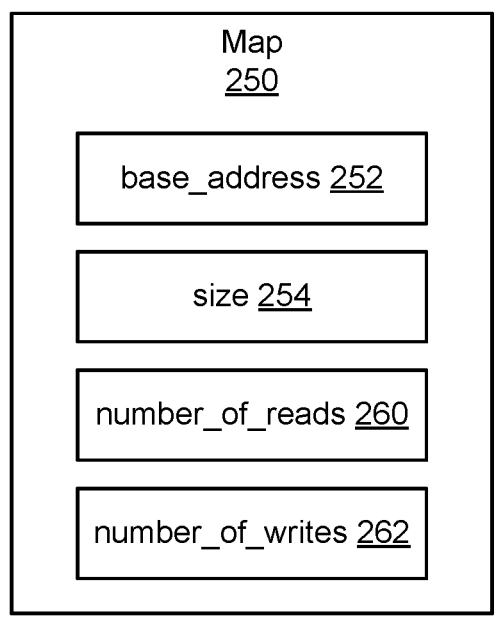
Figure 2C:
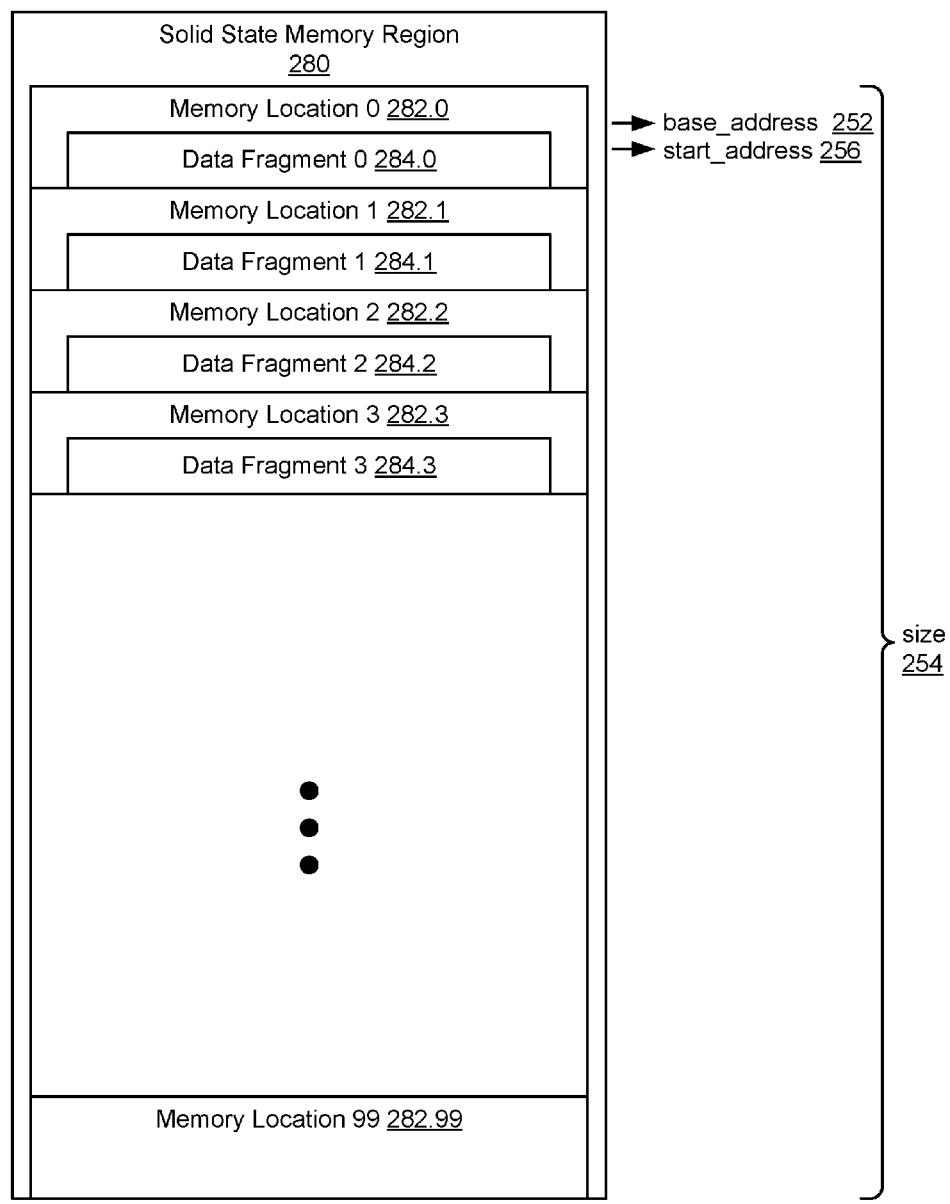

Turning to FIG. 2B, a map is shown. The map (250) in accordance with an embodiment of the technology, is representative for current maps (204A-204N) and previous maps (206A-206N), shown in FIG. 2A. A map (250), in accordance with one or more embodiments of the technology, includes the following entries: "base_address" (252), "size" (254), "number_of_reads" (260) and "number_of_writes" (262). Each of these variables is subsequently described. Further, the use of these variables is illustrated in FIG. 2C, where an exemplary memory region is shown, and in the use case described with reference to FIGS. 6A-6C.

The variable "base_address" (252), in accordance with an embodiment of the technology, specifies the beginning of the memory region described by the map (250). "base_address" may be specified, for example, as an offset value that enables read and/or write operations pertaining to a storage object to be directed to an appropriate physical storage location in the solid state memory. "base_address" may thus point to the first memory location of a memory region, regardless of where that memory region is located in the solid state memory.

The variable "size" (254), in accordance with an embodiment of the technology, specifies the size of the memory region described by the map (250). Depending on how the solid state memory is addressed, "size" may be a number of memory locations. "size", in accordance with an embodiment of the technology, is the number of memory locations required to accommodate the storage object, stored in the memory region.

An illustration of the use of the variables "base_address" (252) and "size" (254) is provided below, with reference to FIG. 2C.

The variable "number_of_reads" (260), in accordance with an embodiment of the technology, documents the number of read operations from the solid state memory region described by the map (250). Accordingly, with each read operation, regardless of the memory location in the solid state memory that is being accessed, "number_of_reads" (260) may be incremented. "number_of_reads" (260) in the map (250) may be optional, i.e., in some embodiments of the technology, the map (250) may not include "number_of_reads". The tracking of "number_or_reads" may be relevant, for example, in cases where read operations cause wear to the solid state memory.

The variable "number_of_writes" (262), in accordance with one or more embodiments of the technology, documents the number of write operations to the solid state memory region described by the map (250). Accordingly, with each write operation, regardless of the memory location in the solid state memory region described by the map (250) that is being accessed, "number_of_writes" (262) may be incremented.

A map, in accordance with one or more embodiments of the technology, is used to establish a mapping between a logical address provided by a client when attempting to perform a read or write operation, and a physical address pointing to a particular memory location. Although in the mapping, subsequently described and used by the methods of FIGS. 3-5 a logical address is translated to a physical address by applying an offset, other mappings may be implemented without departing from the invention. For example, the logical to physical mapping function may make use of address randomization, a lookup table, a mathematical function, or other methods, without departing from the invention.

FIG. 2C shows an exemplary structure of a solid state memory region (280), in accordance with one or more embodiments of the technology. The solid state memory region (280) may be a memory region allocated in the solid state memory (122) of a storage module (120) and may be used to accommodate a storage object (210). The solid state memory region (280) may be addressed using elements of a map (250), e.g. using the variable "base_address" (252). Further the storage object stored in the solid state memory region may be of a size, specified by "size" (254).

The exemplary solid state memory region in FIG. 2C includes 100 memory locations (282.0-282.99) to accommodate 99 data fragments that form the storage object. Each memory location may be a sub region of a specified size, in the solid state memory region. A memory location may include a specified number of bits (e.g., if a memory location is configured to store a single variable only), or it may span larger regions, e.g., bytes, kilobytes, megabytes, etc. A memory location may be occupied by a data fragment (e.g., data fragments 0-3 (284.0-284.3), or it may be empty (e.g., memory location 99 (282.99). A complete set of data fragments, stored in the solid state memory region, may form a storage object, as previously described in FIG. 2B.

Each of the memory locations (282.0-282.99) may be addressed using a combination of "base_address (252) and an additional offset from the base address. Consider, for example, a scenario in which the solid state memory region (280), as shown in FIG. 2C, begins at base address 1,000. To reach the first data fragment (data fragment 0 (284.0)) of the storage object stored in the solid state memory region (280), the base address "1,000" may be used in combination with memory location 0. To reach the third data fragment (data fragment 2 (284.2)), the base address "1,000" may be used in combination with memory location 2.

One skilled in the art will recognize that the solid state memory regions are not limited to the exemplary solid state memory region shown in FIG. 2C. For example, the size of the solid state memory region may vary. Further, map entries including "base_address" and "size" may be expressed using various formats. While in the above description discrete numbers (e.g. memory location 0, 1, 2, . . . ) were used to express these quantities, they may alternatively be expressed using other units, for example units of memory, e.g., bits, bytes, kilobytes, etc.

FIGS. 3-5 show flowcharts in accordance with one or more embodiments of the technology. FIGS. shows a method for performing a write operation to a solid state memory region, in accordance with an embodiment of the technology. FIGS. 4 and 5 show methods for mitigating the effects of wear of the solid state memory region. While the flowcharts of FIGS. 3-5 are based on the assumption that write operations to a solid state memory region cause wear, additionally or alternatively, read operations performed on the solid state memory region may also wear out the solid state memory region. Accordingly, the subsequently described methods may also be performed to mitigate the effects of wear caused by read operations.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3-5 may be performed in parallel with any other steps shown in FIGS. 3-5 without departing from the technology.

FIG. 3 shows a method for performing a write operation to a solid state memory region, in accordance with an embodiment of the technology.

Turning to FIG. 3, in Step 300, a write request to write a data fragment to a logical address is received by the storage appliance. The write request may have been received from a client attempting to write to the solid state memory of the storage appliance. The request may be received by the storage appliance and may reach the storage module controller of the storage module to which the client is attempting to write. The request, in accordance with an embodiment of the technology, includes a data fragment to be written and a logical address to be written to (e.g., memory location 1, 2, 3, etc., as illustrated in FIG. 2C).

In Step 302, the physical address corresponding to the logical address is identified. This address translation may enable the storage appliance to identify the memory location where the data fragment is to be stored, in a particular storage module. The address translation may be performed by the storage module controller, e.g., by an FPGA of the storage module controller that may be specialized in rapidly performing logical to physical address translations during write or read operations. Physical addresses for both the previous memory region and the current memory region may be determined, if a migration operation is in process.

In Step 304, a determination is made about whether the physical address that corresponds to the logical address included in the write request, is directed to a memory location that has been migrated. In one embodiment of the technology, once a memory region reaches a critical wear level, the memory region is designated a previous memory region, whereas a newly allocated memory region becomes the current memory region. Data fragments are gradually migrated from the previous memory region to the current memory region, until all data fragments are migrated. As the data fragments are being migrated, some data fragments may have been migrated to the current memory region, whereas other data fragments may still be stored in the previous memory region. The "migration_progress_index" may document the data fragments that have been migrated to the current memory region. In one embodiment of the technology, the data fragments are migrated in sequential order, and "migration_progress_index" refers to the physical address of the most recently migrated data fragment. The determination of Step 304 may thus be made based on a comparison of the physical address obtained in Step 302 with "migration_progress_index".

If the physical address of the write request is directed to a memory location that has not yet been migrated to the current memory region, the method may proceed to Step 306. If the logical address of the write request is directed to a memory location that has been migrated to the current memory region, the method may proceed to Step 308.

In Step 306, the data fragment is written to the memory location identified by the physical address of the previous memory region.

In Step 308, the data fragment is written to the memory location identified by the physical address of the current memory region.

In Step 310, the "number_of_writes" is incremented. "number_of_writes", in accordance with an embodiment of the technology, is used to track the number of writes that have occurred in the corresponding solid state memory region. If the number of writes performed in the solid state memory region exceeds a specified threshold, a wear level operation may be performed, as described in FIGS. 4. If the number of writes performed in the solid state memory region exceeds another specified threshold, a migration operation may be performed, as described in FIGS. 4 and 5. As described in FIG. 2B, the "number of writes" variables may exist in the maps for previous and current memory regions. Accordingly, "number_of_writes" for the current memory region may be incremented if the data fragment is written to a memory location in the current memory region, and "number_of_writes" for the previous memory region may be incremented if the data fragment is written to a memory location in the previous memory region.

Although not shown in FIG. 3, read operations performed on the tracked memory region may be tracked using "number_of_reads" for either the current memory region or the previous memory region. Alternatively, read operations may also be tracked using "number_of_writes", e.g., "number_of_writes" may be incremented each time when a read operation is performed. If the aging effect caused by a read operation is different from the aging effect caused by a write operation, scaling may be applied. For example, if the aging effect caused by a read operation is only 50% of the aging effect caused by a write operation, "number_of_writes" may be incremented by 0.5 rather than 1.0 after a read operation has occurred.

FIG. 4 shows a method for handling wear of a solid state memory region, in accordance with one or more embodiments of the technology. The method may ensure that (i) a solid state memory region is worn equally and (ii) when the solid state memory region reaches a critical wear level, data stored in the memory region is migrated to a fresh memory region.

In Step 400, a determination is made about whether "number_of_writes" is greater than or equal to "write_migration_threshold". "write_migration_threshold" determines when a migration operation, described below, is executed. "write_migration_threshold" may initially be set to, for example, 10,000, such that a migration level operation is performed after 10,000 write operations to the solid state memory region. After completion of the migration, "write_migration_threshold" may be incremented (as described in FIG. 5), for example, to 20,000, such that another migration operation may be performed once an additional 10,000 write operations have been performed. The method may only proceed to Step 402, if a determination is made that "number_of_writes" is equal to or greater than "write_migration_threshold". Although not shown in FIG. 4, a similar determination may be performed for "number_of_reads", in embodiments where the number of read operations may trigger a migration operation.

An assumption may be made that all memory locations of the memory region are worn approximately equally due to the periodically performed wear level operation, described below. Based on this assumption, a threshold may be set to determine that the memory region is worn, once the number of writes and/or reads performed on a memory location approaches a maximum number of writes and/or reads, at which point the memory location may no longer reliably retain data. The threshold may be chosen to include a safety margin. For example, the threshold may be set such that the memory region write and/or read limit is considered to be reached once 50% of the maximally permissible writes and/or reads have been performed.

In Step 402, a migration operation is performed. The migration operation, in accordance with an embodiment of the technology, is designed to migrate data fragments of a storage object stored in a first memory region to a second memory region, once it has been determined that the first memory region is reaching its wear limit During the migration, the first memory region is designated the previous memory region, whereas the second memory region becomes the new current memory region to be used exclusively for storage of the storage object after the completed migration. The details of Step 402 are described in FIG. 5.

Returning to Step 400, if a determination is made that "number_of_writes" is not greater than or equal to "write_migration_threshold", the method may proceed to Step 404.

In Step 504, a determination is made about whether "number_of_writes" is greater than or equal to "write_wear_level_threshold". "write_wear_level_threshold" determines when a wear level operation, described below, is executed. "write_wear_level_threshold" may initially be set to, for example, 100, such that a wear level operation is performed after 100 write operations to the solid state memory region. After completion of the wear level operation, "write_wear_level_threshold" may be incremented, for example, to 200, such that another wear level operation may be performed once an additional 100 write operations have been performed. The method may only proceed to Step 406, if a determination is made that "number_of_writes" is equal to or greater than "write_wear_level_threshold". Although not shown in FIG. 4, in embodiments of the technology where the number of read operations may trigger a wear level operation, a similar determination may be performed for "number_of_reads" by comparing "number_of_reads" against "read_wear_level_threshold".

In Step 406, a wear level operation is performed. The wear level operation, in accordance with an embodiment of the technology is designed to balance the wear of the memory locations of the memory region. The wear level operation may ensure that even though some data fragments may be written more frequently than other data fragments, this write activity does not result in premature failure of the memory region.

FIG. 5 shows a migration operation, in accordance with one or more embodiments of the technology. In one embodiment of the technology, the migration operation is performed before a memory region is worn to an extent where dependable storage data fragments can no longer be guaranteed. The migration operation may be performed in lieu of a wear level operation until all data fragments belonging to the storage object have been migrated to an unused memory region.

In Step 500, the current map, defining the memory region that is to be migrated, is designated the previous map. Concurrently therewith, the current memory region becomes the previous memory region.

In Step 502, a new current map is generated. The new current map, in the subsequent steps, is used to define the memory region to which the data is migrated from the previous memory region.

In Step 504, a new memory region with a new base address is allocated in the solid state memory. The new memory region may be a memory region of a size equal to the size of the memory region to be migrated. The new memory region and the memory region may be located on the same storage module, or they may be located on different storage modules. The new memory region may be located using the new memory region's base address. The base address of the new memory region may be stored in the newly generated current map.

Steps 500-504, in accordance with an embodiment of the technology, may only be performed once, when the migration is initiated. Subsequent Steps 506-516 may be repeated until the migration is completed.

In Step 506, the data fragment stored at the memory location indicated by "migration_progress_index" in the previous memory region is copied to the memory location indicated by "migration_progress_index" in the current memory region. Initially, "migration_progress_index" may be initialized to the last data location of the memory region. Accordingly, during the first migration operation, the data fragment at the last memory location may be migrated. In Step 508, "migration_progress_index" is decremented.

In Step 510, a determination is made about whether the migration has been completed. A migration is completed once all data fragments have been migrated from the previous memory region to the current memory region. If the migration has not yet been completed, the method in FIG. 5 may return to Step 506. Subsequent execution of the method may eventually result in a complete migration. In one embodiment of the technology, a subsequent execution of the method may be delayed for a specified duration to avoid impairing read/write performance from/to the memory region caused by rapid consecutive migration of multiple data fragments. The delay may be implemented, for example, by monitoring "number_of_writes" and/or "number_of_reads" and by only allowing the execution of the next migration operation if a specified number of writes and/or reads have occurred. Once a determination is made that the migration is complete, the method may proceed to Step 512.

In Step 512, the memory region addressed by the previous map is de-allocated. The previous map may no longer be maintained and may be erased from memory. In Step 514, the memory region addressed by the previous map may be labeled as worn out. Labeling the memory region as worn out may prevent future accidental use of the memory region for storage.

In Step 516, "write_migration_threshold" is incremented. If, for example, the next migration operation is to be performed after 10,000 additional write operations, "write_migration_threshold" may be incremented by 10,000. In embodiments of the technology that use a "read_migration_threshold" in order to trigger a migration based on a number of read operations that have occurred, "read_migration_threshold" may similarly be incremented.

Steps 500-516, as described above, may perform a complete migration of all data fragments stored in a memory region, if Steps 506-516 are executed repeatedly. Although the above description discusses a migration starting from the last data fragment, in descending order, to the first data fragment, a migration may alternatively performed starting with the first fragment in a descending order, to the last data fragment, without departing from the technology.

Example Use Case

The use case scenario described below is intended to provide an example of the method for data migration in solid state memory, described in FIGS. 3-5, and is for illustrative purposes only. The use case scenario is based on a system similar to the one shown in FIG. 1, in which data is written to/read from a memory region of a solid state memory module. One skilled in the art will recognize that the method described in FIGS. 3-5 is not limited to the use case scenario described below, but rather is universally applicable to a wide range of solid state memory-based systems of different configuration, complexity and size.

Figure 6A:
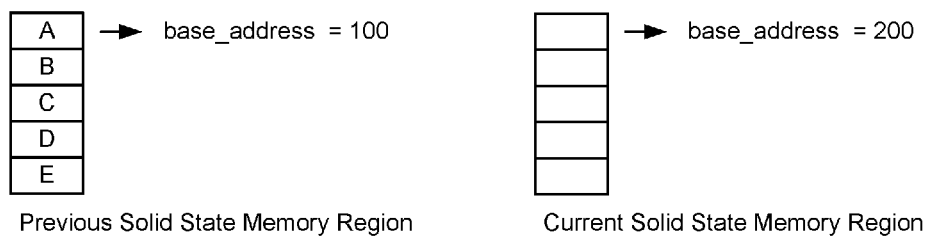
FIGS. 6A-6C show exemplary memory regions, in accordance with one or more embodiments of the technology.
Figure 6B:
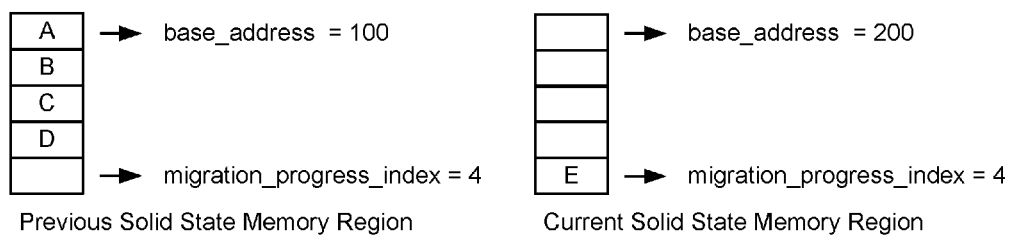
Figure 6C:
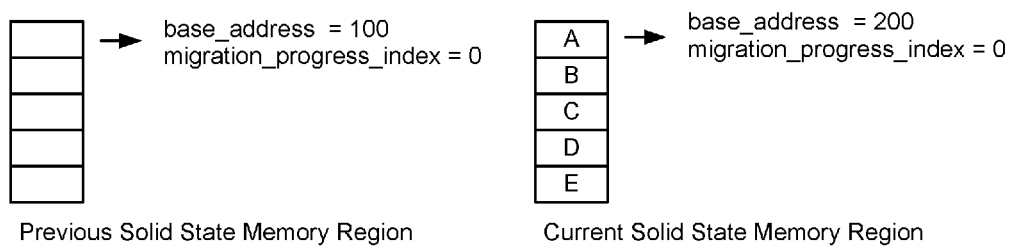

Consider a scenario in which a memory region is used to store data that consists of 5 data fragments A-E. FIGS. 6A-6C show this memory region as methods, in accordance with one or more embodiments of the technology, are performed on the memory region.

As shown in the left panel of FIG. 6A, the data fragments A-E are stored in consecutive order. The physical memory region begins at base address "100", and because the data fragments are stored in consecutive order, the first data fragment "A" is stored in a memory location at the start address "0", i.e., at physical location "100". The entire memory region relied upon for storage of the data fragments A-E includes five memory locations. To write to the memory region, the method described in FIG. 3 is used. For each write operation, "wear_level_counter" and "number_of_writes" are incremented.

In the use case scenario, the system is configured to eventually perform a migration of the data to a new memory region. Accordingly, a new memory region of suitable size is allocated. The physical memory region of the new current memory region begins at base address "200". In the use case, the previous memory region is in a state as shown in the left panel of FIG. 6A. As shown in FIG. 6A, the previous memory region, beginning at base address 100, and the current memory region, beginning at base address 200, coexist. However, while the previous memory region includes data fragments A-E, the current memory region does not yet contain data.

FIG. 6B shows the previous memory region and the current memory region after a migration operation, as described in FIG. 5, is performed for the first time. "migration_progress_index" (previous memory region and current memory region) is set to the last memory location. As a result, data fragment E in the previous memory region is written to the current memory region, to the location indicated by "migration_progress_index". If a read or write operation is now performed, the read/write operation is directed to the previous memory region for data fragments A-D, whereas the read/write operation is directed to the current memory region for data fragment E.

In FIG. 6C, four more migration operations have been performed, thus completing the migration of all data fragments from the previous memory region to the current memory region. All read/write operations may now be directed to the current memory region. Subsequently, memory wear level operations may again be performed, as previously described.

Embodiments of the technology may enable solid state storage systems to mitigate the effects of repeated writing to solid state memory of the solid state storage system that would otherwise, over time, result in failure of the solid state memory. In a system in accordance with one or more embodiments of the technology, wear leveling is used to reduce the effect of frequently written data fragments on individual memory locations. Further, once a memory region is detected to reach its wear limit, the data in the memory region is migrated to a new memory region, in accordance with one or more embodiments of the technology. The above measures, in combination, may significantly prolong the lifetime of the solid state memory while ensuring integrity of the stored data.

The wear level and migration operations are performed such that they may only minimally affect regular read and write operations from/to the solid state memory. Reading and writing, in accordance with an embodiment of the technology, are possible at any time, as a wear level or migration operation is performed. Wear level and migration operations in accordance with an embodiment of the technology cause only a minimal processing burden and require only minimal resources, thus minimizing delays of read and/or write operations that are performed during wear level or migration operations.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for data migration in solid state memory, the method comprising:
    reaching, after performing a first plurality of write operations on a first memory region, a write wear level threshold for the first memory region;
    performing, in response to reaching the write wear level threshold for the first memory region, a wear level operation within the first memory region;
    performing, after the wear level operation, a second plurality of write operations on the first region of the solid state memory;
    reaching, after performing the second plurality of write operations, a write migration threshold for the first memory region;
    in response to reaching the write migration threshold:
        allocating a second memory region in the solid state memory, wherein the second memory region has a base address different from a base address of the first memory region;
        migrating a first data fragment from a first memory location in the first memory region to a corresponding second memory location in the second memory region;
        updating a migration progress index to include the second memory location;
        directing future read and write requests that target memory locations included in the migration progress index to physical addresses in the second memory region; and
        directing future read and write requests that target memory locations not included in the migration progress index to physical addresses in the first memory region.

2. The method of claim 1, further comprising:
    migrating additional data fragments from the first memory region to the second memory region,
        wherein each subsequent migration of an additional data fragment is delayed until a specified number of write operations to the solid state memory has occurred.

3. The method of claim 2, wherein the subsequent migrations are performed in a descending order of memory locations.

4. The method of claim 3, wherein the migration progress index with each subsequent migration is updated to point to the lowest migrated memory location.

5. The method of claim 1 further comprising:
    making a determination that all data fragments of all memory locations in the first memory region have been migrated to memory locations in the second memory region, and based on the determination:
    de-allocating the first memory region; and
    labeling the first memory region as worn out.

6. The method of claim 1, wherein the solid state memory comprises at least one selected from the group consisting of a Phase Change Memory and Spin Torque Magnetic Random Access Memory.

7. A non-transitory computer readable medium (CRM) storing instructions for data migration in solid state memory, the instructions comprising functionality for:
    reaching, after performing a first plurality of write operations on a first memory region, a write wear level threshold for the first memory region;
    performing, in response to reaching the write wear level threshold for the first memory region, a wear level operation within the first memory region;
    performing, after the wear level operation, a second plurality of write operations on the first region of the solid state memory;
    reaching, after performing the second plurality of write operations, a write migration threshold for the first memory region;
    in response to reaching the write migration threshold:
        allocating a second memory region in the solid state memory,
            wherein the second memory region has a base address different from a base address of the first memory region;
        migrating a first data fragment from a first memory location in the first memory region to a corresponding second memory location in the second memory region;
        updating a migration progress index to include the memory location written to in the second memory region;
        directing future read and write requests that target memory locations included in the migration progress index to physical addresses in the second memory region; and
        directing future read and write requests that target memory locations not included in the migration progress index to physical addresses in the first memory region.

8. The non-transitory CRM of claim 7, wherein the instructions further comprise functionality for:
    migrating additional data fragments from the first memory region to the second memory region,
        wherein each subsequent migration of an additional data fragment is delayed until a specified number of write operations to the solid state memory has occurred.

9. The non-transitory CRM of claim 8, wherein the subsequent migrations are performed in a descending order of memory locations.

10. The non-transitory CRM of claim 9, wherein the migration progress index with each subsequent migration is updated to point to the lowest migrated memory location.

11. The non-transitory CRM of claim 7, wherein the instructions further comprise functionality for:
  making a determination that all data fragments of all memory locations in the first memory region have been migrated to memory locations in the second memory region, and based on the determination:
  de-allocating the first memory region; and
  labeling the first memory region as worn out.

12. A system for data migration in solid state memory, comprising:
  at least one storage module comprising solid state memory; and
  a control module configured to:
    make a first determination that, after a first plurality of write operations have been performed on a first memory region, that a write wear level threshold for the first memory region has been reached;
    perform, in response to reaching the write wear level threshold for the first memory region, a wear level operation within the first memory region;
    perform, after the wear level operation, a second plurality of write operations on the first region of the solid state memory;
    make a second determination, after performing the second plurality of write operations, that a write migration threshold for the first memory region has been reached;
    in response to the second determination:
      allocate a second memory region in the solid state memory, wherein the second memory region has a base address different from a base address of the first memory region;
      migrate a first data fragment from a first memory location in the first memory region to a corresponding second memory location in the second memory region;
      update a migration progress index to include the memory location written to in the second memory region;
      direct future read and write requests that target memory locations included in the migration progress index to physical addresses in the second memory region; and
      direct future read and write requests that target memory locations not included in the migration progress index to physical addresses in the first memory region.

13. The system of claim 12, wherein the control module is further configured to:
  migrate additional data fragments from the first memory region to the second memory region,
    wherein each subsequent migration of an additional data fragment is delayed until a specified number of write operations to the solid state memory has occurred.

14. The system of claim 13, wherein the subsequent migrations are performed in a descending order of memory locations.

15. The system of claim 14, wherein the migration progress index with each subsequent migration is updated to point to the lowest migrated memory location.

16. The system of claim 12, wherein the control module is further configured to:
  make a third determination that all data fragments of all memory locations in the first memory region have been migrated to memory locations in the second memory region, and based on the third determination:
  de-allocate the first memory region; and
  label the first memory region as worn out.

17. The system of claim 12, wherein the solid state memory comprises at least one selected from the group consisting of a Phase Change Memory and Spin Torque Magnetic Random Access Memory.

\* \* \* \* \*